United States Patent
Goto et al.

(10) Patent No.: US 7,851,514 B2
(45) Date of Patent: Dec. 14, 2010

(54) PROCESS FOR PRODUCING REGENERATED RESIN, REGENERATED RESIN, PROCESSING RECOVERED MATTER FROM RESIN COMPOSITION, REGENERATED RESIN COMPOSITION AND METHOD OF REGENERATING RESIN COMPOSITION

(75) Inventors: Junya Goto, Tokyo (JP); Masaki Ishikawa, Tokyo (JP); Kazunori Shimoyachi, Tokyo (JP)

(73) Assignee: Sumitomo Bakelite Company, Ltd., Tokyo (JP)

( * ) Notice: Subject to any disclaimer, the term of this patent is extended or adjusted under 35 U.S.C. 154(b) by 25 days.

(21) Appl. No.: 11/991,729

(22) PCT Filed: Sep. 12, 2005
(Under 37 CFR 1.47)

(86) PCT No.: PCT/JP2005/016710

§ 371 (c)(1),
(2), (4) Date: Feb. 18, 2009

(87) PCT Pub. No.: WO2007/032047

PCT Pub. Date: Mar. 22, 2007

(65) Prior Publication Data

US 2009/0318576 A1  Dec. 24, 2009

(51) Int. Cl.
*C08J 11/04* (2006.01)
*C08G 63/02* (2006.01)

(52) U.S. Cl. ............... 521/49; 422/134; 422/184.1; 521/40; 521/49.8; 524/543; 528/176; 549/541; 568/749

(58) Field of Classification Search ............ 521/40, 521/49, 49.8; 524/543; 422/134, 184.1; 528/176; 549/541; 568/749
See application file for complete search history.

(56) References Cited

FOREIGN PATENT DOCUMENTS

| JP | 2001-55468 | 2/2001 |
|---|---|---|
| JP | 2001-151933 | 6/2001 |
| JP | 2003-96233 | 4/2003 |
| JP | 2004-161983 | 6/2004 |
| JP | 2004-231695 | 8/2004 |
| JP | 2005-54138 | 3/2005 |
| JP | 2005-126667 | 5/2005 |

OTHER PUBLICATIONS

Supplementary European Search Report for Application No. EP 05 78 2364 dated Nov. 19, 2009.

*Primary Examiner*—Terressa M Boykin
(74) *Attorney, Agent, or Firm*—Smith, Gambrell & Russell, LLP

(57) ABSTRACT

The invention provides a process for producing a recycled resin, which includes: a first step of decomposing a resin composition containing a thermosetting resin in a supercritical or subcritical solvent having a monomer constituting the thermosetting resin or a derivative thereof as an essential component and a second step of adding a polyfunctional compound thereto to process; a recycled resin or a processed and recovered matter obtained according to the process for producing; a recycled resin composition formed from a recycled resin and/or a processed and recovered matter of the resin composition; and a method for recycling a resin composition, which reuses said recycled resin and/or said processed and recovered matter of a resin composition as a raw material of a recycled resin composition.

8 Claims, No Drawings

PROCESS FOR PRODUCING REGENERATED RESIN, REGENERATED RESIN, PROCESSING RECOVERED MATTER FROM RESIN COMPOSITION, REGENERATED RESIN COMPOSITION AND METHOD OF REGENERATING RESIN COMPOSITION

TECHNICAL FIELD

The invention relates to a process for producing a recycled resin, a recycled resin, a processed and recovered matter from a resin composition, a recycled resin composition and a method for recycling a resin composition.

BACKGROUND ART

Among plastics, thermosetting resins, because these are excellent in the electric insulating property, heat resistance and mechanical strength, are widely used as materials for use in electric and electronic components, automobile components and the like. The thermoplastic resin, when it is once cured, does neither soften nor fuse, nor is dissolved in a solvent; accordingly, it is technically difficult to recycle a valuable chemical raw material from the cured matter. However, in recent years that necessity of environment preservation and formulation of a resource circulation type society are being studied, the recycle of the thermosetting resins is under various studies.

In order to overcome the problems, patent document 1 discloses a technology in which, while a phenol resin is dissolved in phenol that is a constituent monomer of the resin to decompose to a low molecular compound such as phenol, an organic filler is recovered. Furthermore, patent document 2 discloses a technology where alcohol under a supercritical or subcritical state is brought into contact with a phenol resin to decompose to and recover phenol, and further describes to the effect that, from the recovered phenol, through a reaction with formaldehyde, a phenol resin may be formed.

[Patent Document 1] Japanese Patent Application Laid-Open No. 2005-054138

[Patent Document 2] Japanese Patent Application Laid-Open No. 2001-055468

DISCLOSURE OF THE INVENTION

Now, in the patent document 1, while a major emphasis is put on to recover an organic filler, there is no mention of optimum conditions for decomposing and recovering the thermosetting resins such as a phenol resin.

On the other hand, in the patent document 2, while the phenol resin is decomposed to phenol that is a constituent monomer, since alcohol under a supercritical or subcritical state reacts with phenol, in actuality, substituted phenol is frequently recovered. As the result, a phenol resin obtained from the recovered monomer is less stable in quality, accordingly, applications thereof are limited.

The invention intends to provide a process for producing a recycled resin, in which, from a resin composition containing a used thermosetting resin, a reusable recycled resin is efficiently obtained; a recycled resin obtained according to the process and a processed and recovered matter of the recycled resin composition; a method for recycling a recycled resin and a processed and recovered matter of the resin composition; and a recycled resin composition.

The inventors found that when, with a monomer that constitutes a thermosetting resin to be decomposed or a derivative thereof (hereinafter, in some cases, referred to simply as "constituting monomers") as a solvent, the thermosetting resin is decomposed under a particular condition, an obtained oligomer in a first recovered matter has a particular molecular weight distribution and a recycled resin obtained with the oligomer in the first recovered matter has stable quality, and, thereby, the invention came to completion.

That is, the invention provides:

(1) a process for producing a recycled resin that includes: a first step where a resin composition containing a thermosetting resin is decomposed in a supercritical or subcritical solvent having a monomer constituting the thermosetting resin or a derivative thereof as an indispensable component; and a second step where a polyfunctional compound is added to process, (2) the process for producing a recycled resin, wherein, in the process for producing a recycled resin of the (1), in the second step, a component capable of reacting with the polyfunctional compound contained in a first recovered matter in the first step and the polyfunctional compound are reacted, (3) the process for producing a recycled resin, wherein, in the process for producing of (1) or (2) of a recycled resin, the monomer or a derivative thereof is a phenol compound, (4) the process for producing a recycled resin, wherein, in the process for producing a recycled resin of any one of (1) to (3), the first step is carried out in the presence of a basic catalyst, (5) the process for producing a recycled resin, wherein, in the process for producing a recycled resin of any one of (1) to (4), the first step is carried out in a temperature range of 100° C. or more and 500° C. or less, (6) the process for producing a recycled resin, wherein in the process for producing a recycled resin of any one of (1) to (5), the first step is carried out in a pressure range of 1 MPa or more and 60 MPa or less, (7) the process for producing a recycled resin, wherein in the process for producing a recycled resin of any one of (1) to (6), the second step is carried out in a temperature range equal to or less than the temperature of the first step, (8) the process for producing a recycled resin, wherein in the process for producing a recycled resin of any one of (1) to (7), the second step is carried out in a pressure range equal to or less than the pressure of the first step, (9) the process for producing a recycled resin, wherein in the process for producing a recycled resin of any one of (1) to (8), the polyfunctional compound is selected from formaldehyde, paraform, trioxane and hexamethylenetetramine,

(10) the process for producing a recycled resin, wherein in the process for producing a recycled resin of any one of (1) to (9), an addition amount of the polyfunctional compound is, to 100 parts by weight of an oligomer of a first recovered matter obtained in the first step, 1 parts by weight or more and 50 parts by weight or less,

(11) the process for producing a recycled resin, wherein in the process for producing a recycled resin of any one of (1) to (10), the thermosetting resin is one or more kinds selected from a phenol resin, an epoxy resin, a melamine resin and a urea resin,

(12) the process for producing a recycled resin, wherein in the process for producing a recycled resin of any one of (1) to (11), the thermosetting resin includes a phenol resin,

(13) a recycled resin obtained according to a process for producing a recycled resin of any one of (1) to (12),

(14) the recycled resin, wherein in the recycled resin of (13), a molecular weight distribution (Mw/Mn) is 2.0 or more and 15 or less,

(15) the recycled resin, wherein in the recycled resin of (13) or (14), a resin component having the weight average molecular weight (Mw) of 200 or more and 100,000 or less is a main component,

(16) a processed and recovered matter of a resin composition that includes a residue other than a resin component obtained according to a process for producing a recycled resin of any one of (1) to (12),

(17) the processed and recovered matter of a resin composition, wherein in the processed and recovered matter of a resin composition of (16), the residue is a processed and recovered matter of a resin composition including one or more kinds selected from an undecomposed resin component of a resin composition including the thermosetting resin, a polymerization and carbonization product of the resin composition and a filler contained in the resin composition,

(18) a recycled resin composition obtained with the recycled resin of any one of (13) to (15) and/or the processed and recovered matter of a resin composition of (16) or (17) as a raw material, and

(19) a process for recycling a resin composition, which includes reusing the recycled resin of any one of (13) to (15) and/or the processed and recovered matter of a resin composition of (16) or (17) as a raw material of a new recycled resin composition.

According to the invention, a reusable recycled resin may be efficiently obtained from a resin composition containing a used thermosetting resin. Furthermore, an obtained recycled resin and/or a processed and recovered matter of a resin composition may be recycled as a raw material of a recycled resin composition. Still furthermore, a molded product in which a recycled resin composition produced from a recycled resin or a processed and recovered matter of a resin composition is used as a raw material is more excellent in the curability and mechanical strength such as the bending strength, bending elastic modulus than a molded product obtained by a conventional method for recycling.

BEST MODE FOR CARRYING OUT THE INVENTION

Embodiments of a process for producing a recycled resin of the invention, a recycled resin and a processed and recovered matter of a resin composition, and a process for recycling a recycled resin composition and a resin composition will be described hereinafter.

A process for producing a recycled resin involving the embodiment includes, in a processing of a resin composition containing a thermosetting resin, a first step where a resin composition containing a thermosetting resin is decomposed in a supercritical or subcritical solvent having monomers constituting the thermosetting resin as an essential component; and a second step where a polyfunctional compound is added thereto to process. According to the process, a reusable recycled resin may be efficiently obtained from a used resin composition. Furthermore, a recycled resin and/or a processed and recovered matter of a resin composition obtained according to the process for producing a recycled resin is introduced into a process for recycling a resin composition to reuse as a raw material of a recycled resin composition, and, according to the recycling process, a recycled resin composition is obtained. The processing of a resin composition in the embodiment includes a processing due to a chemical decomposition and/or a processing due to physical solubilization.

A resin composition containing a thermosetting resin that is processed in the embodiment may include a cured resin, an uncured or half-cured resin and a varnish containing the resins. Furthermore, other than single thermosetting resin, molded materials or molded articles containing inorganic fillers such as silica fine particles and glass fibers or organic fillers such as wood powders, laminate boards such as inorganic base materials such as glass woven fabrics and glass nonwoven fabrics or organic base materials such as paper and cloth, metal clad laminate boards obtained by adhering a metal foil such as a copper foil, and thermosetting resin products such as printed circuit boards obtained by processing the copper clad laminate boards.

The thermosetting resin that is applied to the embodiment is not particularly restricted. A phenol resin, an epoxy resin, a melamine resin and a urea resin may be particularly effectively applied. Furthermore, one that contains a phenol resin is more preferred.

Examples of such phenol resins include novolak phenol resins such as a phenol novolak resin, a cresol novolak resin and a bisphenol A novolak resin; and resol phenol resins such as an unmodified resol phenol resin and a resol phenol resin modified by wood oil, linseed oil, walnut oil or the like.

Furthermore, when a resin composition to be processed is in a solid form, the shape and size thereof are not particularly restricted. The solid resin composition may be pulverized to an appropriate size considering necessary cost for pulverization and the decomposition speed. Usually, a particle diameter is 1000 μm or less, preferably 500 μm or less and more preferably 250 μm or less.

(Process for Producing Recycled Resin)

(1) Step of Decomposing a Resin Composition Containing a Thermosetting Resin (First Step)

In the first step, a resin composition containing a thermosetting resin is decomposed in a heating and pressurizing vessel and in a supercritical or subcritical solvent having monomers constituting the thermosetting resin as an essential component to obtain a first recovered matter.

(a) Solvent

Examples of monomers constituting a thermosetting resin, which are used as a solvent in the embodiment, include phenol compounds, urea, melamine compounds that are usually used as monomers for a phenol resin, an epoxy resin, a urea resin or a melamine resin urea, and derivatives of the monomers.

As such constituent monomers, phenol compounds in which at least one of hydrogen atoms bonded to a carbon atom of an aromatic ring is substituted by a hydroxyl group and that function as a supercritical or subcritical solvent as a single solvent or a mixture with other solvent and are capable of decomposing and/or solubilizing a resin composition may be cited. Examples thereof include mononuclear phenol compounds such as phenol, cresol, xylenol, resorcin and alkyl-substituted phenol or naphthol compounds such as 1-naphthol and 2-naphthol. Among these, from the viewpoint of the cost and an effect imparting to the decomposition reaction, phenol is preferred.

Alternatively, as the constituent monomers, melamine compounds may be cited. Preferable examples thereof include melamine or compounds such as acetoguanamine and benzoguanamine, in which an amino group of melamine is substituted by other functional group.

As constituent monomers, one kind or a combination of two kinds thereof may be used.

Furthermore, the constituent monomers may contain one obtained when a producing process of the embodiment of a recycled resin is applied to decompose a resin composition, followed by separating and purifying.

When, as the solvent, a mixture of the constituent monomers and other solvent is used, and, as other solvents, all that are used as a solvent in an ordinary chemical reaction such as water, alcohols such as methanol and ethanol, glycols such as ethylene glycol and propylene glycol, ketones, ethers, esters, organic acids and acid anhydrides may be used. Furthermore, a plurality of solvents may be used. Among the solvents, from the viewpoint of an effect imparting on the decomposition reaction and easy availability, water is preferred. Furthermore, a blending ratio of the other solvent to the constituent monomers is, based on 100 parts by weight of the constituent monomers, preferably from 1 to 500 parts by weight and more preferably from 5 to 50 parts by weight.

Still furthermore, a usage ratio of a solvent having the constituent monomers of the thermosetting resin as an essential component is, based on 100 parts by weight of the resin composition, preferably in the range of 50 to 1000 parts by weight and more preferably in the range of 100 to 400 parts by weight. When the usage ratio of the solvent is too small, in some cases, the decomposition reaction of the resin composition may become difficult to be smoothly conducted, and, when the usage ratio is too high to the contrary, an amount of heat necessary for heating the solvent becomes huge, that is, the energy consumption becomes huge. Accordingly, when the usage ratio of the solvent is set in the above range, a balance between the smoothness of the decomposition reaction and suppression of the energy consumption becomes excellent.

(b) Processing Conditions

The decomposition processing conditions according to the embodiment may well render the solvent having the constituent monomers as the essential component supercritical or subcritical state, and this may be achieved by controlling mainly a temperature and pressure.

The temperature is usually preferably in the range of 100 to 500° C. and more preferably in the range of 200 to 450° C. When a temperature is too low, in some cases, the decomposition rate of the resin composition may be lowered to make a processing in a short time become difficult. On the other hand, when the temperature is too high, side reactions such as a pyrolysis reaction and a dehydration reaction may be accompanied to vary a chemical structure of the first recovered matter, so that the reuse of the first recovered matter as a chemical raw material may become difficult. That is, when the temperature is set in the above range, a balance between maintaining a rapid decomposition rate and suppression of the side reaction becomes excellent.

Furthermore, the pressure is usually preferably in the range of 1 to 60 MPa and more preferably in the range of 2 to 40 MPa. When the pressure is too low, the solvent becomes not a supercritical or subcritical state but a vapor or gas state, so that the decomposition rate may become lower to make the processing itself in the first step become difficult. On the other hand, when the pressure is too high, while a unit operable under more severe conditions becomes necessary and energy necessary for maintaining high pressure increases, in some cases, the decomposition rate may be hardly improved and an outstanding effect may not be obtained. When the pressure is set in the above range, a balance between maintaining high rapid decomposition rate and suppression of the energy consumption becomes excellent.

Furthermore, the first step is continued until a molecular weight distribution (Mw/Mn) of an oligomer contained in the first recovered matter generated by decomposing the resin composition becomes a constant value. The reaction time is 1 to 60 minutes and preferably substantially 3 to 30 minutes.

The molecular weight distribution (Mw/Mn) of the oligomer at the end of the first step is preferably in the range of 1.0 or more and 3.0 or less and more preferably in the range of 1.0 or more and 2.0 or less. Thus, in the embodiment, an oligomer having a specified molecular weight distribution is obtained in the first step; accordingly, quality of a recycled resin obtained in a second step where the oligomer thus obtained is used becomes stable.

The molecular weight distribution (Mw/Mn) of the oligomer at the end of the first step is preferably measured by use of gel permeation chromatography (GPC). As specific examples of measurement units and conditions at that time, two of TSKgel GMHXL and two of TSKgel G2000HXL (both trade names, produced by Tosoh Corporation) are used as a separation column and tetrahydrofuran is used as an eluent, a calibration curve is obtained in terms of polystyrene, a differential refractive index meter is used as a detector, and a flow rate and a temperature are set, respectively, at 1 ml/min and 40° C.

The first step in the embodiment, from the viewpoint of improving a processing rate, is preferably carried out in the presence of a basic catalyst. The basic catalyst at that time is not particularly restricted. Examples thereof include a Broensted base, a Lewis base, or natural inorganic and organic compounds, synthetic inorganic and organic compounds and compounds showing an equivalent effect upon hydration with a metal oxide, and one kind or a combination of two kinds thereof may be used.

(2) Processing with Polyfunctional Compound (Second Step)

In the second step, depending on the circumstances, in a heating and pressurizing vessel, a polyfunctional compound is added to allow a reaction component that becomes a polymerization point with a polyfunctional compound contained in the first recovered matter obtained in the first step and the polyfunctional compound to react to render an oligomer contained in the first recovered matter higher in molecular weight. Thereby, while, in the conventional recycle of a resin composition, since the resin composition is decomposed to monomers, when it is reused as a resin composition, a polymerization reaction has to be carried out once more. In the embodiment, since a recovered matter is obtained as a resin at high yield and the molecular weight and the like may be controlled by an amount of the added polyfunctional compound and other reaction conditions, a recycled resin with easiness of reuse and high in the added value is obtained.

(a) Polyfunctional Compound

A polyfunctional compound that is used in the embodiment is a compound that reacts with an oligomer and/or constituent monomers constituting a thermosetting resin, which are contained in the first recovered matter obtained in the first step, to render the oligomer higher in the molecular weight. As such polyfunctional functions, for example, aldehyde compounds may be cited, and, among them, formaldehyde compounds are preferably used. Preferable examples of the formaldehyde compounds include, other than formaldehyde, paraform and trioxane, a compound such as hexamethylenetetramine that becomes a formaldehyde source and aqueous solutions thereof, and these may be used singularly or in a combination of two kinds thereof.

In the embodiment, a usage ratio of the polyfunctional compound added is, based on 100 parts by weight of the oligomer contained in the first recovered matter obtained in the first step, preferably in the range of 1 part by weight or more and 50 parts by weight or less and more preferably in the range of 2 parts by weight or more and 25 parts by weight or less. When the usage ratio of the polyfunctional compound is too small, in some cases, a reaction that renders the oligomer higher in the molecular weight may not be forwarded, and, to the contrary, when the usage ratio is too high, gelation of a product obtained in the reaction that renders the oligomer higher in the molecular weight is forwarded to lower the recovery efficiency of a recycled resin. When the usage ratio of the polyfunctional compound is set in the above range, a process of the reaction that renders the oligomer higher in the molecular weight may be stayed in a suitable range. That is, a molecular weight of the obtained recycled resin may be fallen in a desired range.

(b) Processing Conditions

Processing conditions due to a polyfunctional compound in the embodiment may be controlled mainly by a temperature and pressure.

A temperature in the processing conditions due to a polyfunctional compound is usually set preferably at 100° C. or more and a temperature of the first step or less, and more preferably at 150° C. or more and 200° C. or less. When the processing temperature is too high, a rate of a reaction that achieves a higher molecular weight may become too large, so that in some cases, the gelation of the recycled resin component may be forwarded. To the contrary, when the temperature is too low, in some cases, it may become difficult to render the recycled resin component higher in the molecular weight in a short time. When the reaction temperature is set in the above range, the reaction may be forwarded at a rate of rendering a molecular weight higher to an extent that does not expedite the gelation.

Furthermore, as for the pressure in the processing conditions due to a polyfunctional compound, usually, pressure that is atmospheric pressure or more and equal to that in the first step or less is preferably employed and pressure that is atmospheric pressure or more and 5 MPa or less is more preferably employed. When the pressure at processing is too large, the rate for achieving a high molecular weight may become too large, so that in some cases, the resin component may be promoted in the gelation. On the other hand, when the pressure at processing is too small, in some cases, a outstanding effect may not be obtained in achieving high molecular weight. When the pressure is set in the above range, maintenance of a decomposition rate to an extent that does not cause gelation and the suppression of the energy consumption are excellently balanced.

Still furthermore, as for the atmosphere in the second step, both of air atmosphere and inert gas atmosphere such as nitrogen may be selected, and both of an open system and a closed system may be used, without particular restriction. The processing time in the second step is controlled in the range of 1 to 60 min and usually preferably set in the range of substantially 3 to 30 min.

(Recycled Resin and Processed and Recovered Matter)

As for a typical example of a chemical structure of a recycled resin obtained according to a process for producing a recycled resin according to the embodiment, when a thermosetting resin that is a raw material is a phenol resin, a novolak phenol resin where nuclei of a phenol skeleton form a methylene bond is cited. When the thermosetting resin is a melamine resin, a melamine resin where nuclei of a melamine skeleton form a methylene bond is cited. When the thermosetting resin is a urea resin, a urea resin where nuclei of a urea skeleton form a methylene bond is cited. When the thermosetting resin is an epoxy resin, a compound having a structure where nuclei of a main skeleton of the epoxy resin form a methylene bond such as bisphenol A, bisphenol F, a phenol novolak resin or a cresol novolak resin, is cited. When epichlorhydrine is further added to reacted with the recycled resin obtained from the epoxy resin, a compound having a structure where the recycled resin is epoxidized is cited. Furthermore, when the thermosetting resin that is a raw material contains a phenol resin, a melamine resin, a urea resin or an epoxy resin, structures where the respective resins and respective nuclei of the phenol skeletons, melamine skeletons, urea skeletons or main skeletons of the epoxy resin are copolymerized through a methylene bond are cited. However, the chemical structures are only one example and the chemical structures of the obtained recycled resins are not particularly restricted.

Thus obtained recycled resin usually has a molecular weight in the range of 200 to 100,000, and the molecular weight distribution (Mw/Mn) is preferably in the range of 2.0 or more and 15 or less and more preferably in the range of 3.0 or more and 10 or less. Here, the molecular weight of a main component of the recycled resin means a weight average molecular weight (Mw).

The molecular weight in the range of 200 to 100,000 is substantially same as that of a chemical raw material (prepolymer) used when a resin composition containing a thermosetting resin is produced, so that, when purified as needs arise, it may be reused as a prepolymer. A phrase that a resin component having the molecular weight in the range of 200 to 100,000 is a main part means that a resin component having the molecular weight shown here is contained 50% by weight or more. However, other than a portion having the molecular weight of the main portion, a resin component having the molecular weight exceeding 100,000 may be contained as well. The resin component having the molecular weight in the range of 200 to 100,000 in the case of the usual thermosetting resin, corresponds to substantially 2 to 1,000 nuclei of raw material monomers. Furthermore, a compound that mainly has a resin component having the molecular weight in the range of 200 to 100,000 contains not only a component obtained from a thermosetting resin in the resin composition but also, in some cases, a component obtained from an organic filler or a base material contained in the resin composition.

Here, the recycled resin, after a solvent, a residue and the like are separated from one processed in the second step, may be reused as a raw material of a recycled resin composition. As the method of separation, without restricting particularly, processes such as cyclone, filtration, gravitational sedimentation and the like, which are used in a usual solid-liquid separation, are cited. Furthermore, a recycled resin mainly made of a resin component that is obtained in the processing in the second step and has a molecular weight in the range of 200 to 100,000, and a mixture containing a processed and recovered matter of a resin composition described below may be diluted in an organic solvent, followed by applying a solid-liquid separation operation such as cyclone, filtration, gravitational sedimentation or the like.

Furthermore, in the embodiment, constituent monomers of the thermosetting resin, which are an unreacted solvent, are isolated, and, this is, as a new solvent, reused in the processing of a resin composition containing the thermosetting resin. Still furthermore, when the recycled resin mainly made of a resin component having the molecular weight in the range of 200 to 100,000 is distilled or extracted to separate and recover monomers constituting the resin, one reusable as a solvent is obtained. In the reuse thereof, as needs arise, a constituent monomer of a resin or water may be newly added. Here, as for a method of separating an unreacted solvent, without restricting to particular one, any one of flash distillation, reduced-pressure distillation, solvent extraction and the like may be employed.

Furthermore, in the obtained recycled resin, other than a resin component having the molecular weight in the range of 200 to 100,000 an unreacted solvent such as a constituent monomer of the resin, water may be contained a little.

The processed and recovered matter of the embodiment of a resin composition corresponds to a residue other than the recycled resin component obtained according to the method of the embodiment, and contains one or more kinds of an undecomposed resin component of a resin composition containing the thermosetting resin, a polymerization and carbonization product of the resin composition, the filler contained in the resin composition and, depending on the circumstances, the basic catalyst used in the first step. In particular, the filler is reused as a filler of a recycled resin composition. Examples of such fillers include inorganic fillers such as calcium hydroxide, calcium carbonate, magnesium oxide, talc, silica and alumina.

(Method for Recycling Resin Composition and Recycled Resin Composition)

In a recycle process of the embodiment of a resin composition, a recycled resin and/or a processed and recovered matter of a thermosetting resin, which are obtained according to a producing process of the embodiment of a recycled resin, are reused singularly or in a mixture thereof as a raw material of a new recycled resin composition.

As for the method of reuse, for example, in the case of reusing as a raw material of a thermosetting resin molding material, the recycled resin and/or the processed and recovered matter of the resin composition and other raw materials may be mixed and reused according to a known method. At that time, without using raw materials corresponding to new recycled resin and processed and recovered matter of the resin composition, only recycled resin and the like may be used as raw materials or other chemical raw materials and/or fillers may be used in combination. A content of the recycled resin and/or the processed and recovered matter of the resin composition that are reused is, without particularly restricting, based on the whole of a new thermosetting resin molding material, in the range of 2 to 80% by weight and preferably in the range of 5 to 60% by weight.

When the recycled resin is used as a chemical raw material of the thermosetting resin molding material together with other chemical raw materials, a chemical raw material used in combination is not restricted to particular one. Examples thereof include resins such as a novolak phenol resin, a resol phenol resin, an epoxy resin, a melamine resin and a urea resin.

Here, when, for example, a novolak phenol resin is used as the recycled resin, and a novolak phenol is used as a resin that is the other chemical raw material together, usually, hexamethylenetetramine is used as a curing agent. A content of hexamethylenetetramine is, similarly to a usual thermosetting resin molding material, based on 100 parts by weight of a total of the recycled resin and the novolak phenol resin, preferably in the range of 10 to 25 parts by weight. A content of a total of the recycled resin and the novolak phenol resin, including a case where hexamethylenetetramine is used as a curing agent, based on a total of the thermosetting resin molding material, is set at preferably in the range of 20 to 80% by weight and more preferably in the range of 30 to 60% by weight. Furthermore, in order to control the curing rate of the thermosetting resin molding material, as needs arise, magnesium oxide, calcium hydroxide and the like are used as a curing auxiliary agent.

Still furthermore, when a processed and recovered matter of the resin composition is used as a raw material of a thermosetting resin molding material together with an ordinary filler, as for the filler that is used together, without restricting particularly, an inorganic base material and/or an organic base material that is used in an ordinary thermosetting resin molding material may be used as a filler. Examples of the inorganic base materials include glass fiber, calcium carbonate, calcined clay, talc, silica, diatom earth, alumina and magnesium oxide. The inorganic base materials may be selected in accordance with the necessity depending on applications of products. Furthermore, examples of the organic base materials include wood powder, pulp, plywood powder, paper pulverized powder and cloth pulverized powder.

EXAMPLES

The invention will be detailed with reference to examples hereinafter. However, the invention is not at all restricted by the examples.

Example 1

(1) Processing of Cured Matter of Phenol Resin Molding Material

As a resin composition, one obtained by pulverizing a cured matter of a phenol resin molding material (containing a phenol resin and a filer, trade name: PM-8200, produced by Sumitomo Bakelite Co., Ltd.), followed by classifying to a particle diameter of 250 μm or less was used.

Then, when 58.3 g of the cured matter thus obtained and a solvent of a mixture of 85.6 g of phenol and 21.3 g of water were mixed 3.0 g of powdery calcium hydroxide (produced by Kanto Kagaku) was added as a basic catalyst. The mixture was charged in an autoclave (produced by Nitto Kanto Co., Ltd., internal volume: 200 cm$^3$), followed by, while agitating at 300 rpm, heating to an inside temperature of 300° C. to raise the internal pressure of a reactor to 6.0 MPa, further followed by maintaining for 20 min, thereby a decomposition processing involving the first step was carried out.

Here, from a point of time where the cured matter starts dissolving in phenol, a molecular weight distribution (Mw/Mn) of an oligomer contained in the obtained first recovered matter was measured and, when the molecular weight distribution became a constant, the first step was stopped. At this point of time, the molecular weight distribution (Mw/Mn) of the oligomer was 1.5. The molecular weight distribution of the oligomer component was measured by gel permeation chromatography (GPC). At this time, with, as the separation column, two of TSKgel GMHXL and two of TSKgel G2000HXL (both trade names, produced by Tosoh Corporation), and with tetrahydrofuran as an eluent, a calibration curve was obtained based on polystyrene, a differential refractive index meter was used as a detector, and flow rate and temperature, respectively, were set at 1 ml/min and 40° C.

Furthermore, when the oligomer was quantitatively measured according to an analysis by the GPC, a recovery amount of the oligomer at the end of the first step was 81 g.

Still furthermore, in a state where the internal temperature was lowered to 150° C. to set the internal pressure at 0.1 MPa, 4.6 g of formalin (containing 37% of formaldehyde) (produced by Wako Pure Chemical Industries Ltd.) was charged, followed by maintaining for 20 min to apply a processing by a polyfunctional compound according to the second step, followed by air cooling to return to normal temperature and normal pressure. A mixture of a product and an unreacted solvent obtained in the second step was heated under normal pressure and reduced pressure conditions to separate a solvent (phenol, water) and thereby 150 g of a recovered matter was obtained. The recovered matter was, after dissolving in tetrahydrofuran (THF), filtrated with a filter with a pore diameter of 1.0 µm and a THF soluble component was obtained as a filtrate. A THF-insoluble residue remaining on a filter after the filtration was dried at 100° C. for 12 hours and measured.

As the result, it was confirmed that almost all of the THF-insoluble residue was made of an inorganic filler and calcium hydroxide added as a basic catalyst in the cured matter and the other of the recovered matter was, without gelling, dissolved in THF almost 100%. When a product obtained from the THF-soluble portion was analyzed by gas chromatography (detector FID: flame ionization detector: hydrogen flame ionization detector) (GC-FID), other than phenol that was added as a solvent and remained unreacted, byproducts such as xylenol, trimethyl phenol and xanthenes were hardly found.

In order to use the recovered matter obtained above as a recycled material, a molecular weight and the curability were evaluated.

The number average molecular weight (Mn) and weight average molecular weight (Mw) of a product obtained from the THF-soluble portion were measured by gel permeation chromatography (GPC). At this time, with, as the separation column, two of TSKgel GMHXL and two of TSKgel G2000HXL (both trade names, produced by Tosoh Corporation), and with tetrahydrofuran as an eluent, a calibration curve was obtained based on polystyrene, a differential refractive index meter was used as a detector, and flow rate and temperature, respectively, were set at 1 ml/min and 40° C. As the result, it was confirmed that the recovered matter obtained as the THF-soluble portion was a resin component having Mn: 1,000 and Mw: 5,100, that is, a recycled resin was detected.

Furthermore, as a measure of the curability, 100 parts by weight of a product (recycled resin) obtained from the THF-soluble portion was pulverized, followed by blending together with 15 parts by weight of hexamethylenetetramine, further followed by measuring a time (gelling time) until it is gelled on a hotplate set at 150° C., thereby 70 sec was measured.

(2) Preparation of Recycled Resin Composition

From a recycled resin obtained according to the above-mentioned method, a recycled phenol resin molding material that is a recycled resin composition was prepared and the bending strength and bending elastic modulus were evaluated.

To 43 parts by weight of the recycled resin were dry mixed 7 parts by weight of hexamethylenetetramine (produced by Wako Pure chemical Industries, Ltd., special grade), 40 parts by weight of wood powder and 10 parts by weight of calcium carbonate (produced by Wako Pure Chemical Industries, Ltd.) by use of a cooking mill (trade name: fiber mixer, produced by Matsushita Denki Sangyo Corporation), and thereby a phenol resin molding material was obtained. The phenol resin molding material thus obtained was molded by use of a press molding machine (temperature: 175° C., pressure: 10 MPa, molding time: 3 min) to prepare test pieces for measuring the bending strength and bending elastic modulus. The bending strength and bending elastic modulus were measured in accordance with JIS-K6911 "General test method for measuring thermosetting plastic". As the result, the bending strength: 120 MPa and the bending elastic modulus: 8,000 MPa were obtained.

Example 2

Processing and Reuse of Cured Matter of Phenol Resin Molding Material

A processing was applied according to an operation similar to that of example 1, except that a processing temperature in the second step was set at 100° C., and, thereby, a recycled phenol resin molding material was obtained. Results are shown summarized in Table 1.

Example 3

Processing and Reuse of Cured Matter of Phenol Resin Molding Material

A processing was applied according to an operation similar to that of example 1, except that a processing temperature in the second step was set at 250° C., and, thereby, a recycled phenol resin molding material was obtained. Results are shown summarized in Table 1.

Example 4

Processing and Reuse of Cured Matter of Phenol Resin Molding Material

A processing was applied according to an operation similar to that of example 1, except that an amount of formalin charged in the second step was changed from 4.6 g to 2.3 g, and, thereby, a recycled phenol resin molding material was obtained. Results are shown summarized in Table 1.

Example 5

Processing and Reuse of Cured Matter of Phenol Resin Molding Material

A processing was applied according to an operation similar to that of example 1, except that an amount of formalin charged in the second step was changed from 4.6 g to 57.5 g, and, thereby, a recycled phenol resin molding material was obtained. Results are shown summarized in Table 1.

Example 6

Processing and Reuse of Cured Matter of Phenol Resin Molding Material

A processing was applied according to an operation similar to that of example 1, except that 1.7 g of paraform was used in place of 4.6 g of formalin in the second step, and, thereby, a recycled phenol resin molding material was obtained. Results are shown summarized in Table 1.

Example 7

Processing and Reuse of Cured Matter of Phenol Resin Molding Material

A processing was applied according to an operation similar to that of example 1, except that 1.7 g of trioxane was used in place of 4.6 g of formalin in the second step, and, thereby, a recycled phenol resin molding material was obtained. Results are shown summarized in Table 1.

Example 8

Processing and Reuse of Cured Matter of Phenol Resin Molding Material

A processing was applied according to an operation similar to that of example 1, except that 1.7 g of hexamethylenetetramine (HMTA) was used in place of 4.6 g of formalin in the second step, and, thereby, a recycled phenol resin molding material was obtained. Results are shown summarized in Table 1.

Example 9

Processing and Reuse of Cured Matter of Phenol Resin Molding Material

A processing was applied according to an operation similar to that of example 1, except that a recycled resin obtained by separating a solid residue from a processed and recovered matter according to a similar operation, followed by processing under the similar conditions, and, thereby, a recycled phenol resin molding material was obtained. Results are shown summarized in Table 1.

Example 10

Processing and Reuse of Cured Matter of Phenol Resin Molding Material

A processing was applied according to an operation similar to that of example 1, except that 10 g of the solid residue component of the recovered matter obtained in example 1 was used in place of 10 g of calcium carbonate as an inorganic filler, and, thereby, a recycled phenol resin molding material was obtained. Results are shown summarized in Table 1.

Example 11

Processing and Reuse of Cured Matter of Phenol Resin Molding Material

A processing was applied according to an operation similar to that of example 1, except that an amount of formalin charged in the second step was changed from 4.6 g to 69 g, and, thereby, a recycled phenol resin molding material was obtained. Results are shown summarized in Table 1.

Example 12

Processing and Reuse of Cured Matter of Phenol Resin Molding Material

A processing was applied according to an operation similar to that of example 1, except that calcium hydroxide that is a basic catalyst was not added in the first step, and, thereby, a recycled phenol resin molding material was obtained. Results are shown summarized in Table 1.

Example 13

Processing of Cured Matter of Epoxy Resin Molding Material and Preparation of Recycled Phenol Resin Molding Material A processing was carried out according to an operation similar to that of example 1, except that a cured matter of 58.3 g of an epoxy resin molding material for encapsulating semiconductor (trade name, EME-6300H, one obtained by curing an ortho-cresol novolak epoxy resin with a novolak phenol resin and containing silica, produced by Sumitomo Bakelite Co., Ltd.) was used as a resin composition to be processed, and 120 g of a resin component was obtained.

Comparative Example 1

Processing and Reuse of Cured Matter Of Phenol Resin Molding Material

A processing was applied according to an operation similar to that of example 1, except that the second step was not applied, and, thereby, a recycled phenol resin molding material was obtained. Results are shown summarized in Table 1.

Comparative Example 2

Processing and Reuse of Cured Matter Of Phenol Resin Molding Material

Formalin was charged in the first step as in example 1 in place of charging formalin in the second step, thereby, a recycled phenol resin molding material was obtained. Results are shown summarized in Table 1.

TABLE 1

Results of Modification and Reuse of Phenol Resin Molding Material

| | First Step | | | Second Step | | | | |
|---|---|---|---|---|---|---|---|---|
| | Processing temperature at first step [° C.] | Molecular weight distribution of oligomer Mw/Mn | Recovered amount of oligomer [g] | Kind of polyfunctional compound | Addition amount of polyfunctional compound containing water [g] | Addition amount of polyfunctional compound [g] | Processing temperature at second step [° C.] | Recovered amount of regenerated resin *) [g] |
| Example 1 | 300 | 1.5 | 81 | Formalin (37%) | 4.6 | 1.7 | 150 | 121 |
| Example 2 | 300 | 1.5 | 81 | Formalin (37%) | 4.6 | 1.7 | 100 | 118 |
| Example 3 | 300 | 1.5 | 81 | Formalin (37%) | 4.6 | 1.7 | 250 | 110 |
| Example 4 | 300 | 1.5 | 81 | Formalin (37%) | 2.3 | 0.9 | 150 | 100 |
| Example 5 | 300 | 1.5 | 81 | Formalin (37%) | 57.5 | 21.3 | 150 | 128 |
| Example 6 | 300 | 1.5 | 81 | Paraform | 1.7 | 1.7 | 150 | 110 |
| Example 7 | 300 | 1.5 | 81 | Trioxane | 1.7 | 1.7 | 150 | 105 |
| Example 8 | 300 | 1.5 | 81 | HMTA | 1.7 | 1.7 | 150 | 99 |
| Example 9 | 300 | 1.5 | 81 | Formalin (37%) | 4.6 | 1.7 | 150 | 119 |
| Example 10 | 300 | 1.5 | 81 | Formalin (37%) | 4.6 | 1.7 | 150 | 121 |
| Example 11 | 300 | 1.5 | 81 | Formalin (37%) | 69.0 | 25.5 | 150 | 90 |
| Example 12 | 300 | 2.0 | 70 | Formalin (37%) | 4.6 | 1.7 | 150 | 98 |
| Example 13 | 300 | 1.1 | 45 | Formalin (37%) | 4.6 | 1.7 | 150 | 96 |
| Comparative Example 1 | 300 | — | — | — | — | — | — | 81 |
| Comparative Example 2 | 300 | — | — | Formalin (37%) | 4.6 | 1.7 | — | 60 |

| | Characteristics of Regenerated Resin | | | Characteristics of Regenerated Resin Composition | | |
|---|---|---|---|---|---|---|
| | Molecular Weight of Regenerated Resin | | | Gelling Time | Bending Strength | Bending Elastic |
| | Mn | Mw | Mw/Mn | [sec] | [MPa] | Modulus [MPa] |
| Example 1 | 1000 | 5,100 | 5.1 | 70 | 120 | 8000 |
| Example 2 | 880 | 3,100 | 3.5 | 80 | 99 | 7210 |
| Example 3 | 990 | 7,300 | 7.4 | 65 | 125 | 8100 |
| Example 4 | 750 | 2,500 | 3.3 | 80 | 97 | 7190 |
| Example 5 | 1100 | 15,000 | 14 | 60 | 130 | 8300 |
| Example 6 | 1000 | 5,800 | 5.8 | 68 | 120 | 8000 |
| Example 7 | 450 | 1,000 | 2.2 | 69 | 100 | 7300 |
| Example 8 | 700 | 1,500 | 2.1 | 68 | 90 | 7080 |
| Example 9 | 1000 | 5,100 | 5.1 | 70 | 120 | 8000 |
| Example 10 | 1000 | 5,100 | 5.1 | 70 | 120 | 8000 |
| Example 11 | 1300 | 18,000 | 14 | 60 | 130 | 8300 |
| Example 12 | 600 | 6,500 | 10.8 | 69 | 100 | 7100 |
| Example 13 | 650 | 2,800 | 4.3 | 131 | 74 | 6410 |
| Comparative Example 1 | 500 | 800 | 1.6 | 97 | 82 | 7020 |
| Comparative Example 2 | 750 | 17,000 | 23 | 80 | 100 | 7280 |

*) Since an organic filler component contained in the resin composition and a phenol compound that is a solvent are coupled, an amount of recovered resin increases than an amount of charge thermosetting resin.

As obvious from the results shown in Table 1, when a polyfunctional compound is not added (comparative example 1), a molecular weight of a recovered recycled resin is small. Furthermore, when a polyfunctional compound is added in the first step (comparative example 2), because of gelation of a resin in an obtained recovered matter, the recovering rate is low.

On the other hand, when a second step where a polyfunctional compound is added is disposed as shown in examples 1 to 13, it is found that a recycled resin having a high molecular weight may be, without gelling, efficiently recovered. Furthermore, it is found that, when a second step is disposed, the curability, the bending strength and bending elastic modulus of a molded product obtained from a recycled resin composition of which raw material is a first recovered matter obtained in the first step are improved more than ever.

The invention claimed is:

1. A process for producing a recycled resin, comprising:
    a first step of obtaining a decomposed resin composition which contains a resin monomer or a derivative thereof by decomposing at least one thermosetting resin selected from the group consisting of a phenol resin, an epoxy resin, a melamine resin and a urea resin in a supercritical or subcritical solvent at a temperature ranging from 100° C. to 500° C. and a pressure ranging from 1 MPa to 60 MPa until the molecular weight distribution (Mw/Mn) of an oligomer contained in the decomposed resin composition ranges from 1.0 to 3.0, and
    a second step of adding a polyfunctional compound selected from the group consisting of formaldehyde, paraform, trioxane and hexamethylenetetramine to the decomposed resin composition.

2. The process for producing a recycled resin as set forth in claim 1, wherein a component contained in the decomposed resin composition reacts with said polyfunctional compound.

3. The process for producing a recycled resin as set forth in claim 1, wherein said monomer or a derivative thereof is a phenol compound.

4. The process for producing a recycled resin as set forth in claim 1, wherein said first step is carried out in the presence of a basic catalyst.

5. The process for producing a recycled resin as set forth in claim 1, wherein said second step is carried out in a temperature range of 100° C. or more and equal to or less than said temperature for said first step.

6. The process for producing a recycled resin as set forth in claim 1, wherein an additional amount of said polyfunctional compound is, based on 100 parts by weight of an oligomer of the decomposed resin composition, 1 part by weight or more and 50 parts by weight or less.

7. The process for producing a recycled resin as set forth in claim 1, wherein said thermosetting resin comprises a phenol resin.

8. The process for producing a recycled resin as set forth in claim 1,
wherein the pressure range in the first step is 2-40 MPa.

* * * * *